Oct. 11, 1955

C. R. PROEFROCK 2,720,148

ATTACHMENT FOR CULTIVATORS

Filed July 31, 1952

Carl R. Proefrock
INVENTOR.

BY *Clarence A. O'Brien*
*and Harvey B. Jacobson*
Attorneys

United States Patent Office 2,720,148
Patented Oct. 11, 1955

2,720,148
ATTACHMENT FOR CULTIVATORS

Carl R. Proefrock, Springfield, Ill.

Application July 31, 1952, Serial No. 301,834

5 Claims. (Cl. 97—194)

This invention relates to new and useful improvements and structural refinements in cultivators, and the principal object of the invention is to provide an attachment for tractor mounted cultivators, whereby old stocks of corn, etc., lying in the field, may be prevented from being dragged along by the cultivator shovels and fenders and damaging the new crop.

Conventionally, such old stocks, etc., required the operator to stop the tractor, dismount and cast the debris aside. The instant invention eliminates this disadvantage, since the old stocks, etc., are automatically broken up and thrown aside while the device is in motion.

Some of the advantages of the invention reside in its simplicity of construction, in its efficient and dependable operation, and in its adaptability for attachment to cultivators of different types.

With the above more important objects and features in view, and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
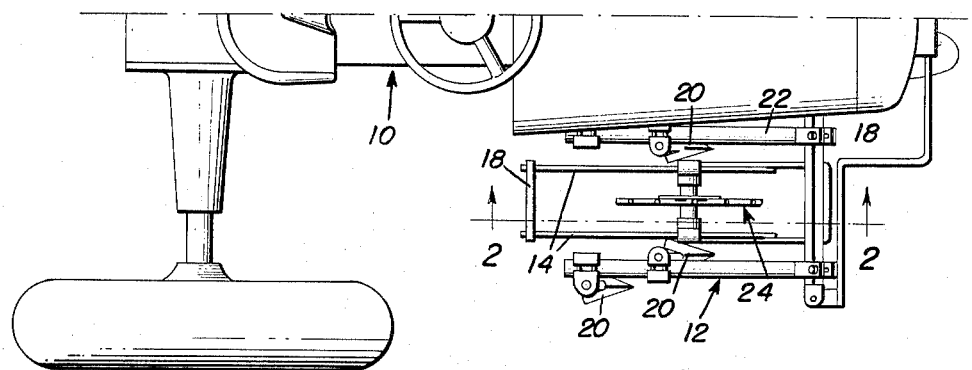
Figure 1 is a fragmentary top plan view of a tractor mounted cultivator, showing the invention associated therewith.

Referring now to the accompanying drawings in detail, the invention assumes the form of an attachment for cultivator units, mounted upon a tractor 10, one of these units being designated generally by the reference character 12 and including a pair of transversely spaced fenders 14 which are conventionally attached to the tractor by suitable brackets 16, 18, as will be readily understood.

Figure 2:
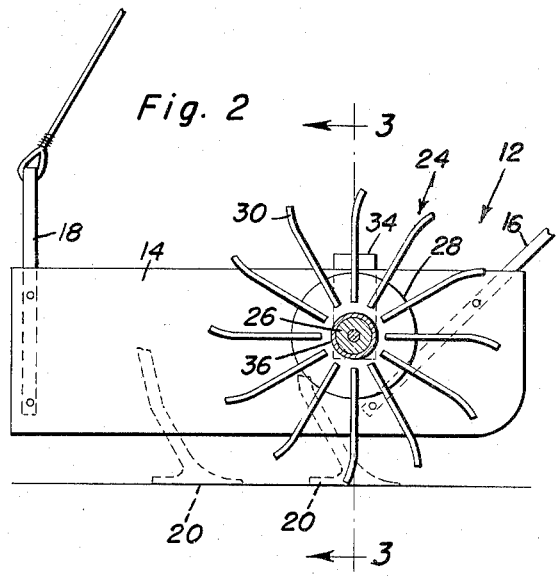
Figure 2 is a fragmentary vertical sectional view, taken substantially in the plane of the line 2—2 of Figure 1.

The cultivator also includes a plurality of shovels 20 which are attached to the tractor by suitable supports 22 and are disposed at the outside of the fenders 14. The shovels project downwardly below the lower edges of the fenders, as is best shown in Figures 2, 3 and 4.

The invention is in the form of an attachment which is designated generally by the reference character 24, and comprises a rotatable wheel including a hub 26 having a flange 28 to which are secured the plurality of radially projecting spokes 30.

Figure 3:
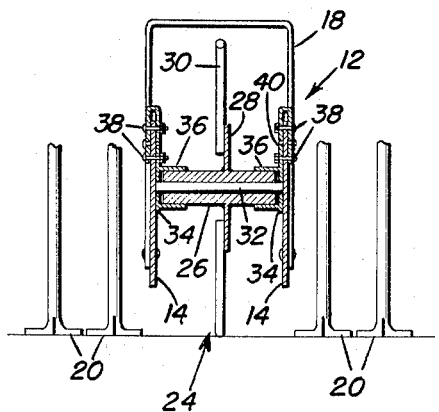
Figure 3 is a transverse sectional view, taken substantially in the plane of the line 3—3 of Figure 2.
Figure 4:
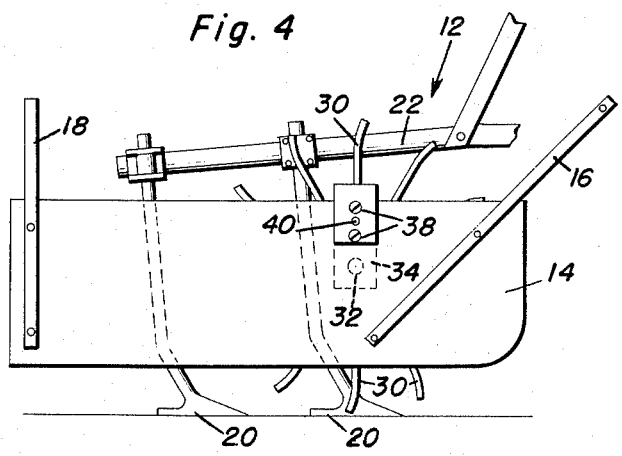
Figure 4 is a fragmentary side elevational view of the cultivator unit per se, including the invention.

The hub 26 is rotatably mounted on the shaft 32 secured in suitable brackets 34, and these brackets are also provided with concentric cups 36 to rotatably receive end portions of the hub 26 therein, as is clearly shown in Figure 3.

Upper end portions of the brackets 34 are turned outwardly and downwardly so as to overlap upper edge portions of the fenders 14, to which the brackets are adjustably secured by a plurality of screws 38. The brackets are provided with vertical rows of apertures 40 to selectively receive the screws 38, whereby the entire attachment may be raised or lowered with respect to the fenders 14.

The spokes 30 project downwardly below the lower edges of the fenders 14, substantially to the level of the shovels 20 so that when the invention is placed in use and the cultivator is propelled forwardly by the tractor, the spokes 30 will engage the ground and rotation will be imparted to the assembly 26, 28, 30, with the result that the spokes 30 will engage old stocks, etc., lying on the ground and these stocks will be brought in contact with the fenders 14 and broken up and thrown aside without damaging the new crop.

It is believed that the advantages and use of the invention will be readily understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a tractor mounted cultivator, a pair of transversely spaced fenders, cultivator shovels provided at the outside of said fenders, and a protector attachment comprising a wheel rotatably mounted in a vertical plane between the fenders, said wheel including a plurality of ground engaging spokes, said wheel being disposed forwardly of said cultivator shovels.

2. In a tractor mounted cultivator, the combination of a pair of transversely spaced fenders having upper and lower edges, cultivator shovels disposed at the outside of said fenders and projecting below the lower edges thereof, and a protector attachment comprising an axle extending transversely between the fenders, a hub rotatable on said axle, and a plurality of radial spokes connected to said hub, said spokes projecting above and below the respective upper and lower edges of said fenders.

3. The device as defined in claim 2 together with a pair of brackets attached to the respective fenders, said axle being carried by said brackets.

4. The device as defined in claim 3 together with means for adjustably attaching said brackets to said fenders.

5. In combination with a pair of transversely spaced, parallel fenders adapted to be disposed on opposite sides of a row of new plants during cultivation thereof, cultivating shovels disposed at opposite sides of said fenders for cultivating between the plant rows, an axle extending between and secured to said fenders, a spoked wheel journaled on said axle, the spokes of the wheel penetrating the soil of the plant row and turning the wheel upon movement of the fenders over the soil, the lower edges of said fenders terminating above the surface of the soil, said spokes dislodging debris from between the fenders, said axle being disposed forwardly of said cultivating shovels.

References Cited in the file of this patent
UNITED STATES PATENTS

| Number | Name | Date |
|---|---|---|
| 1,731,356 | Smith | Oct. 15, 1929 |
| 1,776,693 | Koch | Sept. 23, 1930 |
| 1,880,584 | Tibbitts | Oct. 4, 1932 |
| 1,908,110 | Braun | May 9, 1933 |
| 2,182,270 | Achen | Dec. 5, 1939 |
| 2,329,794 | Speck | Sept. 21, 1943 |
| 2,542,498 | Forbes | Feb. 20, 1951 |
| 2,597,111 | Lathers | May 20, 1952 |